(12) United States Patent
Baumann et al.

(10) Patent No.: US 7,037,392 B2
(45) Date of Patent: May 2, 2006

(54) METHOD FOR PRODUCING A BAR-TYPE CONDUCTOR

(75) Inventors: Thomas Baumann, Wettingen (CH); Thomas Klamt, Schinznach-Dorf (CH); Hans-Christoph Nienburg, Heidelberg (DE)

(73) Assignee: ALSTOM Technology LTD, Baden (CH)

( * ) Notice: Subject to any disclaimer, the term of this patent is extended or adjusted under 35 U.S.C. 154(b) by 320 days.

(21) Appl. No.: 10/472,059

(22) PCT Filed: Mar. 15, 2002

(86) PCT No.: PCT/IB02/00702

§ 371 (c)(1),
(2), (4) Date: Sep. 16, 2003

(87) PCT Pub. No.: WO02/075902

PCT Pub. Date: Sep. 26, 2002

(65) Prior Publication Data

US 2004/0092064 A1    May 13, 2004

(30) Foreign Application Priority Data

Mar. 16, 2001  (DE) ............................... 101 13 258

(51) Int. Cl.
*H01B 13/06*    (2006.01)
(52) U.S. Cl. .................... 156/51; 156/309.6; 427/118; 427/120; 174/118
(58) Field of Classification Search .............. 156/47, 156/51, 166, 308.2, 309.6; 427/459, 461, 427/470, 185, 202, 117, 118, 120, 446, 449; 174/113 R, 113 A, 118
See application file for complete search history.

(56) References Cited

U.S. PATENT DOCUMENTS

| 4,109,375 | A | 8/1978 | Lin et al. |
| 5,650,031 | A | 7/1997 | Bolon et al. |
| 6,270,598 | B1 * | 8/2001 | Kasahara et al. ............. 156/47 |
| 6,780,457 | B1 * | 8/2004 | Baumann et al. ........... 427/118 |
| 2003/0113441 | A1 * | 6/2003 | Baumann et al. ............. 427/58 |

FOREIGN PATENT DOCUMENTS

| DE | 25 38 702 | | 7/1976 |
| DE | 196 37 983 | A1 | 3/1998 |
| DE | 199 63 376 | A1 | 7/2001 |
| FR | 2 230 110 | | 12/1974 |
| GB | 1142197 | | 2/1969 |
| WO | 97/43816 | | 11/1997 |

OTHER PUBLICATIONS

Search Report from DE 101 13 258.1 (Feb. 26, 2002).
U.S. Appl. No. 10/472,061, filed Sep. 16, 2003, Baumann et al.

* cited by examiner

*Primary Examiner*—John T. Haran
(74) *Attorney, Agent, or Firm*—Cermak & Kenealy LLP; Adam J. Cermak

(57) ABSTRACT

The invention relates to a process for manufacturing a conductor bar comprising a number of partial conductors, with the following steps:
A: manufacturing the partial conductors,
B: applying at least one insulating layer to the partial conductors, in each case with the following substeps:
B1: coating the regions to be insulated of the partial conductor with a plastics powder,
B2: sintering this powder layer by melting the plastic and at least partially curing the plastic to form an insulating layer, the sintering being carried out in such a way that at least one outer insulating layer is not completely cured,
C: assembling a number of insulated partial conductors to form a conductor bar,
D: sintering the insulating layers of the partial conductors while simultaneously pressing the partial conductors against one another in the assembled conductor bar, the plastic in the case of the not completely cured insulating layers at least partially melting and being squeezed out between the partial conductors, and the plastic remaining between the partial conductors curing substantially completely.

8 Claims, No Drawings

METHOD FOR PRODUCING A BAR-TYPE CONDUCTOR

TECHNICAL FIELD

The invention relates to a process for manufacturing an electrically conducting conductor bar comprising a number of partial conductors electrically insulated from one another. Conductor bars of this type may be used for example as stator conductors in rotating electrical machines, for example generators, or in transformers. Conductor bars in which the partial conductors are twisted in a certain manner with respect to one another are also referred to as "Roebel bars". Unlike steel cables, which are constructed from a multiplicity of steel wires of round cross section or hexagonal cross section, the partial conductors of such a conductor bar regularly have a rectangular cross section.

PRIOR ART

In order to reduce the electrical losses, for example in a rotating electrical machine, the partial conductors of the stator conductors used therein are insulated from one another. Accordingly, a conductor bar is assembled from partial conductors which are provided with an insulation. The application of an insulation to the partial conductors may be carried out for example by a two-stage coating process in which, in a first stage, a plastics powder is applied to the surface of the partial conductor in order to form a powder layer. In a second stage, this powder layer is sintered, the plastic melting and—depending on the plastic—also crosslinking and curing. The insulating layer forming in the process must form a closed and substantially homogeneous film in order to perform its insulating function.

In order that an electrically insulating, closed and substantially homogeneous insulating layer is produced when the powder layer is sintered, the application thickness with which the powder layer is applied to the partial conductor must have a specific minimum thickness. Experience shows that the lower limit for an application thickness for which this is satisfied lies around 50 µm. Thin insulating layers are of advantage, however, since on the one hand the current-carrying cross section can be increased while the overall cross section of the conductor bar remains the same, whereby the performance capability of the machine equipped with it increases. On the other hand, the reduction in the insulating thickness of the partial conductors may also be used for a reduction in the overall cross section of the conductor bar, without thereby impairing the performance of the machine equipped with it. It can also be regarded as a further advantage of a reduced partial conductor insulation that the heat transfer between the partial conductors is improved as a result. This is important whenever the partial conductors of the conductor bar heat up differently on account of different losses. The improved heat transfer between the partial conductors allows the different temperatures to be at least partially compensated again.

SUMMARY OF THE INVENTION

The present invention is concerned with the problem of providing a manufacturing process for a conductor bar constructed from a number of partial conductors which makes it possible for particularly thin insulating layers to be formed.

This problem is solved according to the invention by the features of claim 1.

The invention is based on the general idea of organizing the sintering operation in two stages in which, in a first sintering stage, at least part of the insulation of the individual partial conductors is not completely cured and, in a second sintering stage, the partial conductors in the assembled conductor bar are pressed against one another, whereby part of the plastic forming the insulation is displaced and swells out between the partial conductors and only the plastic remaining in the insulation cures. Very small insulating thicknesses can be achieved by this procedure. For example, the component parts of the insulations which have already completely cured during the first sintering stage, when the partial conductors are sintered, have the effect during the second sintering stage, when the assembled conductor bar is sintered, that a sufficient insulating layer remains behind between the neighboring partial conductors to ensure the insulating function of the insulation.

In the case of a preferred embodiment, a number of insulating layers are applied to the partial conductors, with at least the innermost insulating layer being cured substantially completely. This ensures that at least the completely cured insulating layer remains between the partial conductors when the insulation is squeezed out and ensures the insulating effect.

According to a particularly advantageous development, the at least one, substantially completely cured, insulating layer may be derived from a powder layer of an application thickness which is less than approximately 50 µm. This embodiment makes use of the realization that, in a process according to the invention for forming an effective insulation, it is not necessary for the at least one, substantially completely cured, insulating layer of the respective partial conductor to form a closed and homogeneous film already during the manufacture of the partial conductor. This is so because, should gaps or holes exist in this cured insulating layer, they are filled by a subsequently applied insulating layer, these fillings also remaining between the partial conductors when the insulation is squeezed out in the second sintering stage. Accordingly, the desired closed homogeneous film for the insulating layer can form at the latest in the assembled state of the conductor bar.

In the case of another embodiment, at least one insulating layer of the partial conductors which is not completely cured during the sintering of the partial conductors may be derived from a powder layer which is formed by a plastics powder with which there has been admixed a coarse filler, the average grain size of which is less than the application thickness of the powder layer. When the insulation is squeezed out, this coarse filler acts as a spacer and prevents the plastic from being squeezed out completely during the second sintering stage and, as a result, ensures that at least enough plastic to form a fully functional insulation between the partial conductors remains between the partial conductors. This particular embodiment functions even when none of the insulating layers of the partial conductors has been completely cured during the first sintering stage, with the result that particularly thin insulating layers are achievable.

The process according to the invention operates particularly expediently whenever the plastic for forming the insulation is chosen such that and the sintering of the second sintering stage is carried out in such a way that the partial conductors of the assembled conductor bar adhesively bond to one another during the second sintering stage, when the insulation is cured. There is consequently no need for additional features for strengthening and stabilizing the assembled conductor bar.

Further important features and advantages of the process according to the invention emerge from the subclaims and from the description which follows of preferred exemplary embodiments of the invention.

WAYS OF IMPLEMENTING THE INVENTION

In order to manufacture a conductor bar in a way corresponding to the process according to the invention, firstly partial conductors which are to be assembled into a conductor bar must be manufactured. An uninsulated endless wire which has the cross section of the partial conductors to be manufactured and consists of an electrically conducting material, for example copper, is used for the manufacture of these partial conductors. Undeformed partial conductors are then produced from this endless wire by cutting the endless wire to length, to the length of the partial conductors. Depending on the type of conductor bar to be manufactured, the partial conductors may be deformed by bending, in particular bent with an offset, after cutting to length, in order to achieve a desired three-dimensional form for the partial conductors.

At least one insulating layer is then applied to the partial conductors manufactured in this way. The application of such an insulating layer is in this case carried out by a two-stage coating process. In a first substep, the regions to be insulated of the respective partial conductor are coated with a plastics powder. Suitable in particular as the coating powder are thermosetting or elastomeric plastics, such as for example epoxy and silicone resins. In order to improve the mechanical properties of the insulation, for example in order to reduce the coefficient of thermal expansion or reduce the flowing of the plastic at high temperatures and under high loads, inorganic fillers may be admixed with these plastics, for example in concentrations of 10% to 80%.

The coating of the partial conductor is performed for example in an electrostatic fluidized-bed chamber or electrostatic spray chamber, which may be smaller than the partial conductor to be coated. Such a coating chamber has at opposite ends openings through which the partial conductors to be coated are drawn through the chamber individually or more than one at a time. The application rate of the plastics powder, and consequently the application thickness of the powder layer, are controllable for example by means of the feed with which the partial conductor or the partial conductors are drawn through the chamber. In order that the plastics powder remains adhering on the surface of the partial conductors, it is electrically charged for the coating operation.

This is then followed by the second substep, in which the applied powder layer is sintered. During the sintering, the plastic is heated, whereby it melts and at least partially cures, with the insulating layer being formed. If only a single insulating layer is applied to the partial conductor, the sintering is controlled in such a way that this insulating layer does not cure completely.

If a number of insulating layers are applied to the partial conductor, the sintering is controlled in such a way that at least one outer insulating layer is not completely cured.

This second substep is preferably performed in a separate sintering chamber and can similarly be carried out in a continuous process, it being possible for example for optical or electrical or inductive heating to be provided. During the sintering, the plastics powder melts or fuses. In the case of thermosetting materials, there is also thermal crosslinking of the plastic. The fusing and/or crosslinking has the effect that the desired insulating layer is formed. In the case of thermosetting plastics, the degree of curing correlates with the degree of crosslinking. Accordingly, in the case of thermosetting materials, the sintering process at least for one insulating layer is controlled in such a way that this thermosetting insulating layer is not crosslinked or is crosslinked only partially. The degree of crosslinking or the degree of curing may be controlled for example by means of the temperature and by means of the duration of the thermal treatment. The not completely cured or crosslinked insulating layer produced in this way is thermally still reactive.

Once the partial conductors have been provided in this way with one or more insulating layers, they are assembled to form a conductor bar. The conductor bar assembled in this way can then be bent into the desired form that it is intended to have after its completion. In a suitable apparatus, the partial conductors are then pressed against one another in the assembled conductor bar. Carried out at the same time is a renewed sintering operation, in which the plastic of the not completely cured or crosslinked insulating layers at least partially melts again. The pressing to which the partial conductors are subjected has the effect that the melted plastic is squeezed out, with the thickness of the insulation between the partial conductors decreasing. The plastic squeezed out in this way collects for example in corresponding cavities of the conductor bar or on the surface of the bar.

During this operation referred to as "hot pressing", the insulating layers of the partial conductors adjacent to one another are advantageously joined together, whereby the partial conductors of the assembled conductor bar adhesively bond to one another. After curing of the plastic, the conductor bar is made to set in the desired form.

In the case of a special exemplary embodiment, an epoxy resin powder, which has for example an average grain size of about 40 µm, may be used for forming the insulation. This epoxy resin powder is filled for example with 40% $TiO_2$, this filler having for example a d50 value of about 0.2 µm. Four insulating layers are advantageously applied, with the result that a thickness of about 100 µm is obtained for the insulation after the sintering. The operation of sintering the insulating layer first applied is controlled in this case in such a way that the insulating layer cures almost completely, which corresponds for example to a sintering duration of approximately three to five minutes at approximately 180° C. The three subsequent powder layers are sintered only to the extent that the minimum viscosity is just exceeded slightly; this corresponds to a sintering duration of approximately ten to twenty seconds. As a result, the three last insulating layers are not cured, or cured only slightly, with the result that the plastic remains substantially in the so-called "B stage". Accordingly, of the entire insulation, approximately three quarters are in the B stage. During hot pressing of the assembled conductor bar, the plastic in the B stage becomes free-flowing and is squeezed out from the composite assembly. In the case of this exemplary embodiment, the thickness of the insulation can be reduced during hot pressing of the conductor bar to approximately 30 µm, without the quality suffering with regard to homogeneity and the insulating effect of the insulation thereby produced.

In comparison with a conventional procedure, in which the application thickness of the powder layer must comprise approximately 50 µm in order to produce a homogeneous layer, the insulating layer thickness can consequently be approximately halved by the process according to the invention.

In the case of another special embodiment, an epoxy resin powder which has an average grain size of approximately 40 µm is used for producing the insulation. The epoxy resin powder is filled for example with 30% $TiO_2$, it again being possible for the average grain size of this filler to be approximately 0.2 µm. In a way corresponding to this special embodiment, a coarse filler is also admixed with the plastics powder. This coarse filler may form for example approximately 10% of the proportion by mass of the plastics powder. The coarse filler preferably comprises an electrically insulating material, for example ceramic or quartz. Quartz glass beads which have for example an average grain size of approximately 15 µm are preferred here. This plastics powder is also applied for example in four layers, with the result that the overall thickness of the sintered insulation is also about 100 µm. Here, too, each individual insulating layer is thermally sintered, the sintering process, in particular the duration of the heat treatment, for each layer being controlled in such a way that no curing takes place, or minimal curing in which the minimum viscosity is just exceeded slightly; the sintering of each layer at approximately 180° C. takes for example only ten to twenty seconds. This procedure has the effect that all the insulating layers remain substantially in the non-cured B stage.

During the subsequent operation of hot pressing the assembled conductor bar, the coarse fillers serve as spacers and have the effect that the liquefied plastic is not completely squeezed out. The coarse filler also ensures that neighboring partial conductors do not come into electrical contact with one another during the hot pressing.

In the case of this embodiment, a final thickness for the insulation between two neighboring partial conductors of approximately 20 µm can be achieved during the hot pressing, no compromises with regard to the homogeneity of the achievable insulation having to be made here either. Since the insulating layer formed in this way is in each case to be attributed to both partial conductors between which it is formed, each individual partial conductor has an (imaginary) insulating layer with a thickness of approximately 10 µm. By comparison with a conventionally produced layer thickness, this provides an improvement by a factor of 5.

What is claimed is:

1. A process for manufacturing an electrically conductive conductor bar including a number of partial conductors electrically insulated from one another, the method comprising:
    A: manufacturing the partial conductors;
    B: applying at least one insulating layer to the partial conductors, including for each partial conductor sub-steps B1 and B2:
        B1: coating regions to be insulated of the partial conductor with a plastics powder;
        B2: sintering said plastics powder layer by melting the plastic and at least partially curing the plastic to form an insulating layer, the sintering being carried out so that at least one outer insulating layer is not completely cured;
    C: assembling a number of insulated partial conductors to form a conductor bar;
    D: sintering the insulating layers of the partial conductors while simultaneously pressing the partial conductors against one another in the assembled conductor bar, the plastic in the case of the not completely cured insulating layers at least partially melting again and being squeezed out between the partial conductors, and the plastic remaining between the partial conductors curing substantially completely.

2. The process as claimed in claim 1, wherein step B comprises applying a number of insulating layers and wherein at least an innermost insulating layer being cured substantially completely.

3. The process as claimed in claim 2, wherein the at least one substantially completely cured insulating layer is derived from a powder layer of an application thickness which is less than approximately 50 µm.

4. The process as claimed in claim 2, wherein only the innermost insulating layer is cured substantially completely, and wherein all the other insulating layers are not completely cured.

5. The process as claimed in claim 1, wherein at least one insulating layer which is not completely cured in step B is derived from a powder layer which is formed by a plastics powder with which there has been admixed a coarse filler, the average grain size of said filler being less than the application thickness of the powder layer.

6. The process as claimed in claim 5, wherein step B comprises not completely curing all the insulating layers.

7. The process as claimed in claim 5, wherein the coarse filler comprises an electrically insulating material.

8. The process as claimed in claim 1, comprising:
    selecting the plastic for forming the insulation such that the sintering according to step D comprises adhesively bonding the partial conductors of the assembled conductor bar to one another.

* * * * *